United States Patent
Collin (10) Patent No.: US 11,117,745 B2
(45) Date of Patent: Sep. 14, 2021

(54) METHOD FOR SEQUENCING LOADS IN AN AUTOMATED DISTRIBUTION SYSTEM

(71) Applicant: SAVOYE, Dijon (FR)

(72) Inventor: Jean-Michel Collin, Merceuil (FR)

(73) Assignee: SAVOYE, Dijon (FR)

( * ) Notice: Subject to any disclaimer, the term of this patent is extended or adjusted under 35 U.S.C. 154(b) by 254 days.

(21) Appl. No.: 16/461,166

(22) PCT Filed: Nov. 14, 2017

(86) PCT No.: PCT/EP2017/079114
§ 371 (c)(1),
(2) Date: May 15, 2019

(87) PCT Pub. No.: WO2018/091428
PCT Pub. Date: May 24, 2018

(65) Prior Publication Data
US 2020/0102146 A1    Apr. 2, 2020

(30) Foreign Application Priority Data

Nov. 16, 2016 (FR) ...................................... 1661103

(51) Int. Cl.
*G06F 7/00* (2006.01)
*B65G 1/137* (2006.01)
(Continued)

(52) U.S. Cl.
CPC ......... *B65G 1/1373* (2013.01); *B65G 1/0485* (2013.01); *B65G 1/12* (2013.01); *B65G 1/1371* (2013.01); *G06Q 10/087* (2013.01)

(58) Field of Classification Search
CPC ...... B65G 1/1373; B65G 1/0485; B65G 1/12; B65G 1/1371; B65G 1/1375; G06Q 10/087; G06Q 10/06; G06Q 10/08355
(Continued)

(56) References Cited

U.S. PATENT DOCUMENTS

2010/0300048 A1   12/2010   Krizmanic et al.
2019/0389671 A1*  12/2019   Cohen .................. B65G 1/1373

FOREIGN PATENT DOCUMENTS

FR    2915979 A1    11/2008
JP    2005187107 A   7/2005
(Continued)

OTHER PUBLICATIONS

International Search Report dated Nov. 22, 2017 for corresponding International Application No. PCT/EP2017/079114, filed Nov. 14, 2017.
(Continued)

*Primary Examiner* — Yolanda R Cumbess
(74) *Attorney, Agent, or Firm* — David D. Brush; Westman, Champlin & Koehler, P.A.

(57) ABSTRACT

A method of sequencing loads in an automated distribution system having sources, at least one destination, a collector having successive nodes, and a control system to process customer orders. The method includes, for an analyzed node, injection including, to decide whether a load C having a sequential order number of destination for a given destination can be injected into the collector: creating, among the loads to be collected by at least one node downstream to the analyzed node, a list LI1 of loads having an order number of destination lower than the given order number of destination and a list LI2 of loads that are interposed between a load of the list LI1 and the collector; determining whether "the list LI1 is empty" and/or "the list LI1 is not empty and the list LI2 is empty"; if one of the two conditions is verified, then injection of the load C.

9 Claims, 9 Drawing Sheets

(51) Int. Cl.
*B65G 1/04* (2006.01)
*B65G 1/12* (2006.01)
*G06Q 10/08* (2012.01)

(58) Field of Classification Search
USPC .................. 700/213–214, 216, 220, 228
See application file for complete search history.

(56) References Cited

FOREIGN PATENT DOCUMENTS

| | | | |
|---|---|---|---|
| JP | 2008105827 | A | 5/2008 |
| JP | 2008150191 | A | 7/2008 |
| JP | 2015048195 | A | 3/2015 |

OTHER PUBLICATIONS

Written Opinion dated Nov. 22, 2017 for corresponding International Application No. PCT/EP2017/079114, filed Nov. 14, 2017.
International Preliminary Report on Patentability dated Jul. 27, 2018 for corresponding International Application No. PCT/EP2017/079114, filed Nov. 14, 2017.
Japanese Office Action and English translation dated Apr. 30, 2021 for parallel Japanese Application No. 2019-525781.

\* cited by examiner

METHOD FOR SEQUENCING LOADS IN AN AUTOMATED DISTRIBUTION SYSTEM

CROSS-REFERENCE TO RELATED APPLICATIONS

This Application is a Section 371 National Stage Application of International Application No. PCT/EP2017/079114, filed Nov. 14, 2017, which is incorporated by reference in its entirety and published as WO 2018/091428 A1 on May 24, 2018, not in English.

1. FIELD OF THE INVENTION

The field of the invention is that of logistics, and especially that of systems of automated distribution, especially but not exclusively for the preparation of customer orders (also called the preparation of parcels).

More specifically, the invention concerns a method for sequencing loads in such an automated distribution system.

It is assumed that the automated distribution system comprises sources, at least one destination, a collector and a control system. The collector is configured to convey loads up to each destination and comprises a plurality of successive nodes each configured to collect loads coming out of the sources.

The control system is configured to:
process customer orders, each listing loads to be extracted from the sources and to be provided in a given rising order of destination to a given destination;
define an overall or general rising sequential order for the loads listed in the customer orders; and
guarantee, for each source, that loads coming out comply with the overall rising sequential order and the rising order of destination associated with the commands.

The driving or control system (also called a WCS or warehouse control system) is a computerized central management system in charge of controlling the entire system of automated distribution as well as managing customer orders.

The processing (or management) of a given customer order combines all the actions carried out by the control system to control the automated distribution system (including the sources) so that all the loads listed in this given customer order reach the desired destination in the desired order of destination.

The invention can be applied especially but not exclusively when each source of the system of automated distribution is a part of a storage depot (this part of a storage depot is also called a storage unit here below in the description) and each destination of the system of automated distribution is a customer-order preparing station (also called a picking station).

It is clear however that many variants can be envisaged without departing from the framework of the present invention: for example, each source can be defined as a storage depot or even as a unit comprising several storage depots or again as a storage device (which is less complex than a storage depot).

2. TECHNOLOGICAL BACKGROUND

We shall attempt more particularly here below in this document to describe the problems existing in the particular case where the system of automated distribution is used to prepare parcels. The invention is not limited of course to this particular application.

Parcel-preparing systems are more particularly used in firms for the mail-order dispatching and sales of goods in small volumes. The main examples of users of these parcel-preparing automated systems are the suppliers of office equipment, clothing, cosmetic products, tools and spare parts in the engineering industry. These systems enable the preparation, with minimum labor, in a short time span and with precise stock tracking, of a parcel corresponding to a precise customer order from a customer, this customer order relating to different products in different quantities, each of the products with its quantity being identified by a line of the customer order (each line of the customer order therefore defines a storage container in which the desired product is situated).

One example of such an automated system for preparing parcels is described especially in the patent FR 2 915 979 filed by the present Applicant. It comprises for example:

an automated storage depot containing products in storage containers (corresponding to the above-mentioned loads), each storage container being associated with a single product reference (these can also be containers containing a specific customer order and/or a mixture of products);

a set of conveyors carrying storage containers, in which the products are located, from the storage depot to the customer-order preparing or dispatch station and vice versa; and a warehouse control system (WCS).

The automated storage depot comprises for example four storage units, each storage unit being formed by a lane which, on either side, serves a storage rack (or shelving unit) having several superimposed storage levels, each rack being sub-divided along its length into storage locations (also called cells), each storage location being intended to receive a storage container. At each storage level, each lane receives tracks for the movement of a transfer device (also called a collecting and transportation trolley or shuttle) which shifts the storage containers so that they can be positioned within the storage locations and picked from these locations. A track is generally formed by two parallel rails and the trolley is equipped with wheels to move on these rails. The trolleys can not only move horizontally at a given storage level but also be taken from one level of a lane to another when they transport or do not transport a storage container, by means of elevators (also called up/down elevators or spiral conveyors or mini-loaders) which are disposed at one end or at both ends of the lanes (or even in the middle). These elevators furthermore enable the transfer of a storage container placed on a trolley towards the set of conveyors.

The control system manages the customer order that is associated with each parcel (dispatch container) and lists storage containers (loads) according to the location of the storage containers in the storage depot, the availability of the trolleys and the storage depot elevators, as well as the sequential order in which these storage containers must follow one another to the customer-order preparing station. The purpose of this is to optimize all the movements and parcel preparation time and ensure synchronization between the arrival, at the preparing station, of a parcel being prepared and of the storage containers listed in the customer order associated with this parcel being prepared.

Figure 1A:
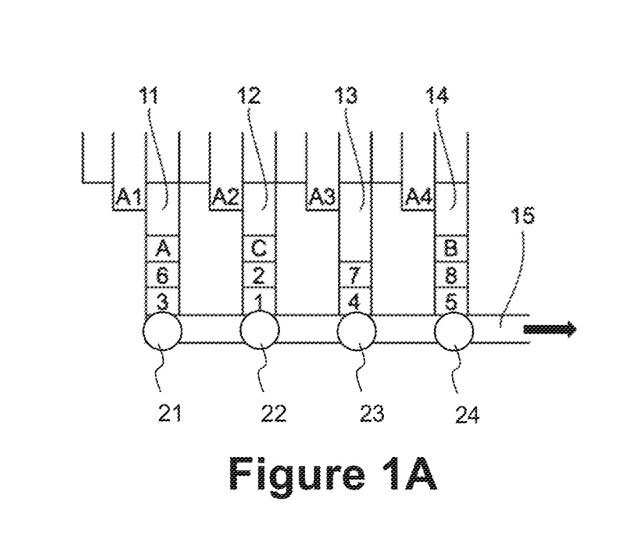
FIGS. 1A to 1C, already described with reference to the prior art, present a technique for processing a customer order (and for sequencing corresponding loads) by means of a control system in a classic system of automated distribution.
Figure 1B:
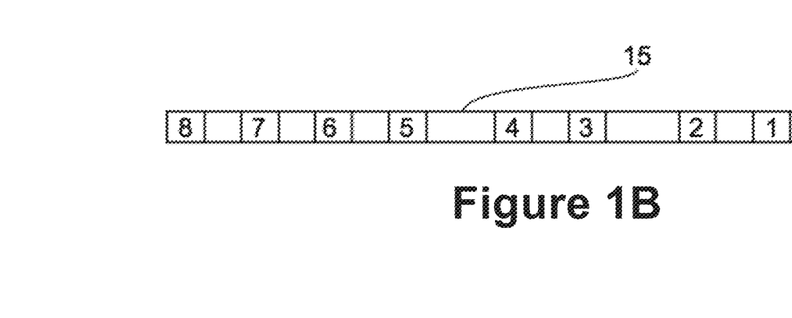
Figure 1C:
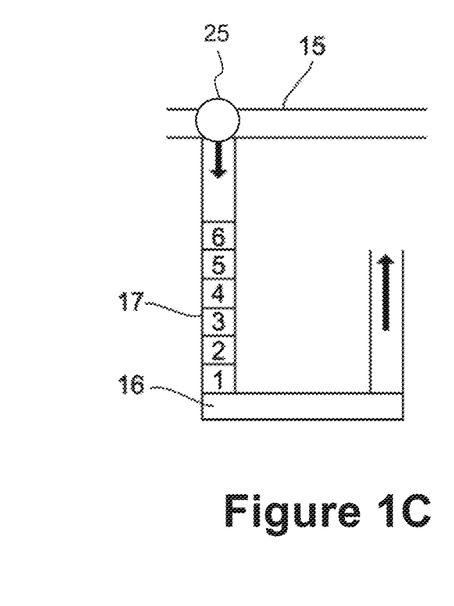

We now present a more detailed view, referring to FIGS. 1A, 1B and 1C, of a present-day technique for processing a customer order (and for the sequencing of corresponding loads) by the control system in the particular context (presented here above) of an automated package-preparing system. With a view to simplification, not all the constituent elements of the system of automated distribution are represented in these figures.

FIG. 1A presents solely:
the extremities of four storage units, A1 to A4, which are part of the automated storage depot and constitute four load-storing sources;
a plurality of FIFO (First In First Out) type buffer devices (referenced 11 to 14) each placed immediately downstream to one of the four storage units A1 to A4; and
a collector 15 (consisting for example of one or more conveyors) collecting, via the nodes 21 to 24, the storage containers exiting the source buffer devices 11 to 14 and conveying them up to the customer-order preparing station. The collector 15 therefore serves to de-localize the customer-order preparing station 16. relative to the automated storage depot. Indeed, the buildings do not always make it possible to place a customer-order preparing station beside the storage depot.

FIG. 1C presents only:
the collector 15;
the customer-order preparing station 16 (comprising for example one or more conveyors) and constituting a destination receiving loads; and
a destination buffer device 17, of the FIFO type, placed upstream to the order-preparing station 16, to receive loads through a node 25.

In this example, it is assumed that the customer order lists eight loads in a given sequential order corresponding to the rising sequential order of references 1 to 8 that the loads bear in the figures. In other words, the customer-order preparing station 16 must receive these eight loads in the sequential order of 1 to 8.

It is also assumed that the loads referenced 3 and 6 are stored in the source A1, the loads referenced 1 and 2 are stored in the source A2, the loads referenced 4 and 7 are stored in the source A3, and the loads referenced 5 and 8 are stored in the source A4.

To process the above-mentioned customer order, the control system carries out a first "intra-source" scheduling (scheduling before the exit from the sources) in commanding each of the sources A1 to A4 so that the loads of the customer order that are stored therein exit according to the given order of destination. Thus, as illustrated in FIG. 1A, the source buffer device 11 (placed downstream relative to the source A1) successively receives the loads referenced 3 and 6. The source buffer device 12 (placed downstream relative to the source A2) successively receives the loads referenced 1 and 2. The source buffer device 13 (placed downstream relative to the source A3) successively receives the loads referenced 4 and 7. The source buffer device 14 (placed downstream relative to the storage unit A4) successively receives the loads referenced 5 and 8.

Then, the control system carries out a second "intersource" scheduling (scheduling after the exit from the sources) by commanding the buffer sources 11 to 14 and the nodes 21 to 24 so that, at the exit from the collector 15, the loads listed in the order are stowed in the desired order of destination. To this end, the decision rules (rules of injection and forward movement) are applied at each of the nodes 21 to 24:

injection rules, for a load that comes to a node from one of the sources A1 to A4 (via one of the source buffer devices 11 to 14):

the load is injected into the collector 15 downstream to this node if this node is the one furthest upstream to the destinations;

for a node other than the one furthest upstream to the destinations, the load is injected if no other load having a lower sequential order number of destination is not present upstream to this node, in one of the source buffer devices or on the collector, and if no other load having a lower sequential order number of destination is present downstream to this node in one of the source buffer devices connected to the other nodes (else, it is not injected);

for example, even if it is ready to exit from the source buffer device 13 via the node 23, the load referenced 4 is not injected into the collector 15 so long as the loads referenced 1, 2 and 3 are situated upstream to the node 23 in one of the source buffer devices 21 and 22 or on the collector 15; and a forward movement rule, for a load already present on the collector 15 and being presented to a node (coming from another upstream node):

the load moves forward if no other load having a lower sequential order number of destination is not present in the source buffer device connected to this node (else, it does not move forward);

for example, if it is assumed that the load referenced 3 has been placed (injected) in the collector 15, then when it is presented to the node 22, it will not move forward so long as the nodes referenced 1 and 2 are situated in the source buffer device 12 connected to this node 22.

FIG. 1B illustrates the loads referenced 1 to 8 being transported by the main collector 15 after having been placed in the desired order of destination (1 to 8).

Finally, as illustrated in FIG. 1C, the control system commands the destination buffer device 17 so that the loads (which enter therein already sorted out in the desired order of destination) can exit at the desired rate in order to be presented to the customer-order preparing station 16.

One drawback of this technique, as illustrated in 1A to 1C (and of its rules of injection and forward movement) is that the fill rate of the collector (and therefore the flowrate at the exit from this collector) is not optimal.

It is therefore necessary to reduce the waiting time for the loads, on the one hand before they are injected into the collector via the nodes and, on the other hand, before they move forward on the collector (also via the nodes).

3. SUMMARY OF THE INVENTION

One particular embodiment of the invention proposes a method for sequencing loads in an automated distribution system comprising sources; at least one destination; a collector configured to transport loads up to said at least one destination and comprising a plurality of successive nodes each configured to collect loads exiting from one of the sources and a control system configured to process customer orders each listing loads to be extracted from the sources and to be provided in a given rising order of destination to a given destination, to define an overall rising order for the loads listed in the customer orders and guarantee, for each source, that exiting loads will comply with the overall rising sequential order and the rising orders of destination associated with the customer orders, characterized in that it comprises, for at least one analyzed node, a step of injection analysis comprising the following steps, to decide whether a load C having a given sequential order number of destination for a given destination can be injected into the collector:
  a) first injection test to determine whether there exists, upstream to the analyzed node, on the collector or among the loads to be collected by at least one node upstream to the analyzed node, at least one load having a sequential order number of destination lower than the given sequential order number of destination;
  b) in the event of a positive response to the first injection test, non-injection of the load C, else:
    creation, among loads to be collected by at least one node downstream to the analyzed node, of a list LI1 of loads having a sequential order number of destination lower than the given sequential order number of destination and of a list LI2 of loads that are each interposed between a load of the list LI1 and the collector;
    second injection test to determine whether one of the following first and second conditions of injection is verified: the first condition of injection being that the list LI1 is empty; the second condition of injection being that the list LI1 is not empty and that the list LI2 is empty;
    if one of the first and second injection conditions is verified, injecting the load C.

The general principle of the invention therefore consists in carrying out an analysis that is finer than in the above-mentioned known solution, to decide whether a load C coming from a source can be injected at the level of an analyzed node. With the proposed solution, in the event of a negative response to the first injection test, the fact that the list LI1 is not empty does not systematically lead to a non-injection of the load. Indeed, the proposed solution relies on a wholly novel and inventive approach that takes account also of the list LI2 to detect a possible inter-blocking between loads. If this list LI2 is empty, there is no risk of inter-blocking and the load is injected (the case where this list LI2 is not empty is described in detail here below). Thus, if the list LI1 is not empty but the list LI2 is empty, the proposed solution results in an injection of the load (while ensuring that there is no risk of inter-blocking) while the above-mentioned known solution leads to a non-injection of the load. Therefore, the proposed solution increases the fill rate of the collector (and therefore the exit flowrate from this collector). This also reduces the waiting time for the loads before they are injected into the collector, via the nodes.

According to one particular characteristic, if neither the first nor the second condition of injection is verified, the injection analysis step comprises:
  a') a third injection test to determine whether, upstream to the analyzed node, on the collector or among the loads to be collected by at least one node upstream to the analyzed node, there is at least one load having a sequential order number of destination lower than the sequential order number of destination possessed by a load from the list LI2 and for a same destination;
  b') in the event of a positive response to the third injection test, non-injection of the load C, else:
    creation, among the loads to be collected by at least one node downstream to the analyzed node, of a list LI3 of loads having a sequential order number of destination lower than the sequential order number of destination possessed by a load of the list LI2 and for a same destination, and a list LI4 of loads that are each interposed between a load of the list LI3 and the collector;
    fourth injection test to determine whether one of the following third and fourth conditions of injection is verified: the third condition of injection being that the list LI3 is empty; the fourth condition of injection being that the list LI3 is not empty and that the list LI4 is empty;
    if one of the third and fourth conditions of injection is verified, then injection of the load C.

Thus, should the list LI2 (nor therefore the list LI1) be not empty, the analysis is continued to decide whether the load C can be injected at the level of the analyzed node. In the event of a negative response to the third injection test, the invention takes account of the list LI3 and LI4 to detect a possible inter-blocking between loads. If one of these two lists LI3 and LI4 is empty, there is no risk of inter-blocking and the load is injected (the case where the list LI4 is not empty is described in detail here below). This further increases the fill rate of the collector (and therefore the exit flowrate from the collector) and further reduces the waiting time of the loads before they are injected into the collector via the nodes.

According to one particular characteristic, if neither the third nor the fourth condition of injection is verified, the step for injection analysis comprises at least one new iteration of the steps a') and b') in taking the list LI4 of the previous iteration as the list LI2 for each new iteration.

Thus, should the list LI4 (nor therefore the list LI3) not be empty, the analysis is continued by a new iteration of the steps a') and b'), to decide whether the load C can be injected into the analyzed node. At each iteration in the event of a negative response to the third injection test, the lists LI3 and LI4 are taken into account to detect a possible inter-blocking between loads and if one of the two lists LI3 and LI4 is empty, there is no risk of inter-blocking and the load is injected. This further increases the fill rate of the collector (and therefore the exit flowrate from the collector) and further reduces the waiting time of the loads before they are injected into the collector via the nodes.

According to one particular characteristic, the step of injection analysis is carried out for each of the nodes except for a first node that is furthest upstream to the destinations.

In this way, the proposed solution for injecting loads at the level of the nodes is applied in a large number of nodes.

According to one particular characteristic, the method comprises, for at least one analyzed node, a step of analysis of forward movement, comprising the following steps to decide whether a load C', coming from a node upstream to the analyzed node and having a given a sequential order number of destination for a given destination, can be moved forward on the collector:
  1) first forward movement test to determine whether, among the loads to be collected by the analyzed node, there is at least one load having a sequential order number of destination lower than the given sequential order number of destination;
  2) in the event of a positive response to the forward movement test, no forward movement of the load C', else:
    the creation, among the loads to be collected by at least one node downstream to the analyzed node, of a list LA1 of loads having a sequential order number of destination lower than the given sequential order number of destination, and a list LA2 of loads that are each interposed between a load of the list LA1 and the collector;
    second forward movement test to determine whether one of the following first and second conditions of forward movement is verified: the first condition of forward movement being that the list LA1 is empty; the second condition of forward movement being that the list LA1 is not empty and that the list LA2 is empty;

if one of the first and second conditions of forward movement is verified, forward movement of the load C'.

Thus, in synergy with the proposed solution for the injection of loads at the level of the nodes, it is also proposed to carry out a finer analysis than in the above-mentioned known solution to decide whether a load C can be moved forward on the collector, at the level of an analyzed node. The combination of the proposed solution for the injection of the loads at the node with the proposed solution for the forward movement of the loads at the nodes increases the fill rate of the collector (and therefore the exit flowrate from this collector) while ensuring overall management of the risks of inter-blocking. With the proposed solution for the forward movement of the loads, a negative response to the first test of forward movement does not routinely lead to a forward movement of the load. Indeed, the proposed solution relies on a wholly novel and inventive approach taking account also of the lists LA1 and LA2 to detect a possible inter-blocking between loads. If one of the lists LA1 and LA2 is empty, there is no risk of inter-blocking and the load is moved forward (the case where this list LI2 is not empty is described in detail here below).

According to one particular characteristic, if neither the first nor the second condition of forward movement is verified, the step of analysis of forward movement comprises:

1') third forward movement test to determine if, among the loads to be collected by the analyzed node, there is at least one load having a sequential order number of destination lower than a sequential order number of destination possessed by a load of the list LA2 and for a same destination;

2') in the event of a positive response to the third forward movement test, no forward movement of the load C', else:

creation, among the loads to be collected by at least one node downstream to the analyzed node, of a list LA3 containing loads having a sequential order number of destination lower than a sequential order number of destination possessed by a load of the list LA2 and for a same destination, and a list LA4 containing loads that are each interposed between a load of the list LA3 and the collector;

fourth forward movement test to determine whether one of the following third and fourth conditions of forward movement is verified: the third condition of forward movement being that the list LA3 is empty; the fourth condition of forward movement being that the list LA3 is not empty and that the list LA4 is empty;

if one of the third and fourth conditions of forward movement is verified, forward movement of the load C'.

Thus, should the list LA2 (or therefore the list LA1) be not empty, the analysis is continued to decide whether the load C can be moved forward at the level of the analyzed node. In the event of a negative response to the third test of forward movement, the invention takes account of the lists 13 and LI4 to detect a possible inter-blocking between loads. If one of these two lists LA3 and LA4 is empty, there is no risk of inter-blocking and the load is moved forward (the case where the list LA4 is not empty is described in detail here below).

According to one particular characteristic, if neither the third nor the fourth condition of forward movement is verified, the step of analysis of forward movement comprises at least one new iteration of the steps 1') and 2'), in taking the list LA4 of the previous iteration as the list LA2 for each new iteration.

Thus, should the list LA4 (or therefore the list LA3) be not empty, the list is continued, by a new iteration of the steps 1') and 2'), to decide whether the load C can be moved forward at the level of the analyzed node. At each iteration, in the event of a negative response to the third forward movement test, the lists LA3 and LA4 are taken into account to detect a possible inter-blocking between loads and if one of the two lists LA3 and LA4 is empty, there is no risk of inter-blocking and the load is moved forward.

According to one particular characteristic, the step of analysis of forward movement is done for each of the nodes except for said first node that is most upstream to the destinations.

In this way, the proposed solution for the forward movement of the loads at the nodes is applied in a large number of nodes.

One particular embodiment of the invention proposes the use of a computer program product comprising program code instructions for implementing the above-mentioned method (in any of its different embodiments) when said program is executed on a computer.

Another embodiment of the invention proposes the use of a computer-readable and non-transient storage medium storing a computer program as mentioned here above.

Another embodiment of the invention proposes a computer program product that comprises program code instructions for the implementation of the above-mentioned method (in any of its different embodiments) when said program is executed on a computer.

Another embodiment of the invention proposes a computer-readable and non-transient storage medium storing a computer program comprising a set of instructions executable by a computer to implement the above-mentioned method (in any one of its different embodiments).

4. LIST OF FIGURES

Other features and advantages of the invention shall appear from the following description given by way of an indicative and non-exhaustive example and from the appended drawings, of which.

5. DETAILED DESCRIPTION

In all the figures of the present document, the identical elements and steps are designated by a same numerical reference.

Figure 2:
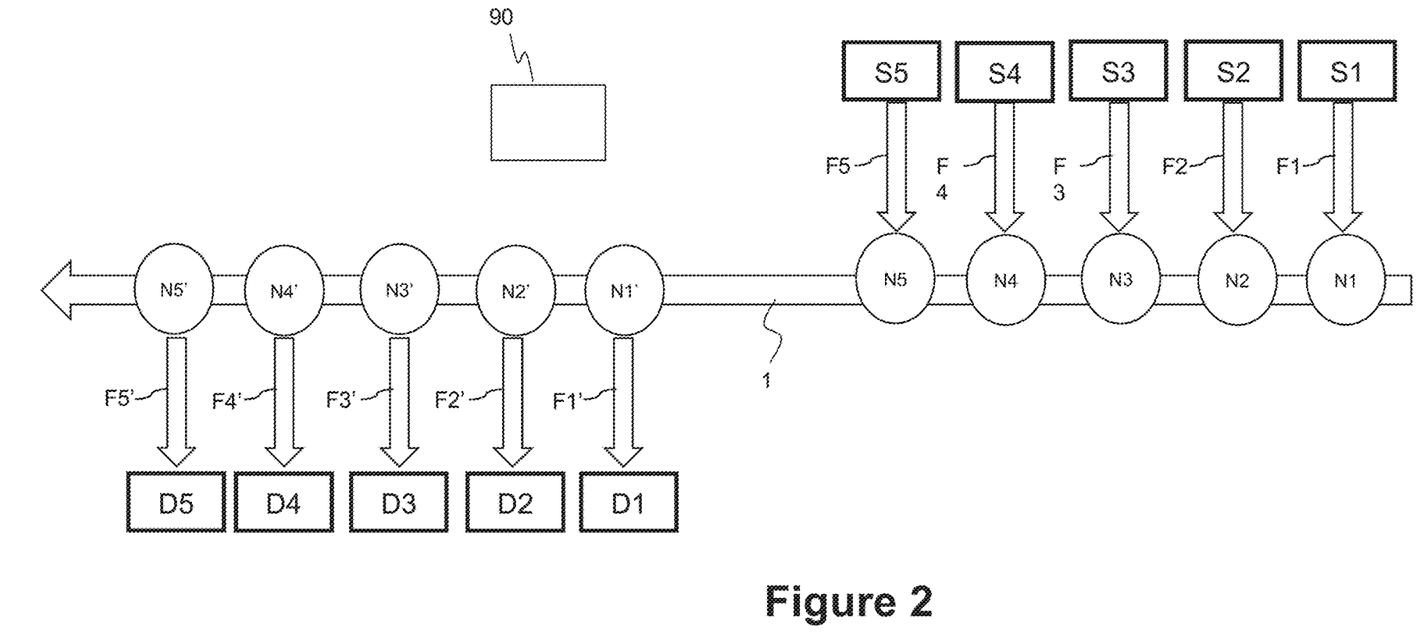
FIG. 2 is a block diagram of a system of automated distribution in which it is possible to implement a load sequencing method according to the invention.

FIG. 2 is a block diagram of an automated distribution system in which a load sequencing method according to the invention can be implemented. The system comprises sources S1 to S5 (for example different parts (storage units) of a storage depot), destinations D1 to D5 (for example a customer order preparing or picking station), a collector 1 (formed for example by several conveyors) and a control system 90 (for example of a WCS type). The number of sources and destinations is purely illustrative.

As already explained further above, the collector 1 is configured to transport loads up to each destination and comprises a plurality of successive nodes. Those referenced N1 to N5 are each configured to collect loads coming out of one of the sources S1 to S5 and those referenced N1' to N5' are each configured to direct loads towards destinations D1 to D5. Each of these nodes comprises for example a transfer device for transfer at 90° or 45°.

Each of the sources S1 to S5 is for example connected to one of the nodes N1 to N5 by a FIFO type source buffer device F1 to F5. Similarly, each of the destinations D1 to D5 is for example connected to one of the nodes N1' to N5' by a FIFO type destination buffer device F1' to F5'.

The control system 90 is configured to process customer orders each listing loads to be extracted from the sources and to be provided in a given rising order of destination to a given destination. It is also configured to define an overall rising sequential order for loads listed in the customer orders (see description of FIG. 6 here below). Finally, it is configured to ensure, for each source, that exiting loads comply with the overall rising sequential order and the rising orders of destination associated with the customer orders.

A load is therefore associated with two sequential order numbers:

an overall sequential order number within the overall sequential order defined for the set of loads exiting from the set of sources, and a sequential order number of destination within an order of destination defined for loads listed in a given customer order.

The control system 90 implements a load sequencing method which, in one particular embodiment of the invention, comprises the following algorithms for each of the nodes collecting loads coming out of the sources, except the one furthest upstream to the destinations (i.e. in the system of FIG. 2, for each of the nodes N2 to N5 but not for the node N1):

an injection analysis algorithm (see FIG. 3), to decide whether a load C having a given sequential order number of destination for a given destination can be injected into the collector downstream to the analyzed node; and a forward movement analysis algorithm (see FIG. 4) to decide whether a load C', coming from a node upstream to the analyzed node and having a given order of destination for a given destination, can be moved forward on the collector downstream to the analyzed node.

For each of the nodes N2 to N5, the sequential order of execution of the injection analysis and forward movement analysis algorithms is any unspecified order. For each of the nodes N2 to N5, the control system 90 executes for example each of these two algorithms at regular time intervals and/or upon detection of an event (for example the arrival of a new load).

For the node N1, each load that arrives (coming from the source S1) is injected without any condition of sequential order. Besides, the question of forward movement of a load does not arise for the node N1 (there is no node upstream).

Figure 3:
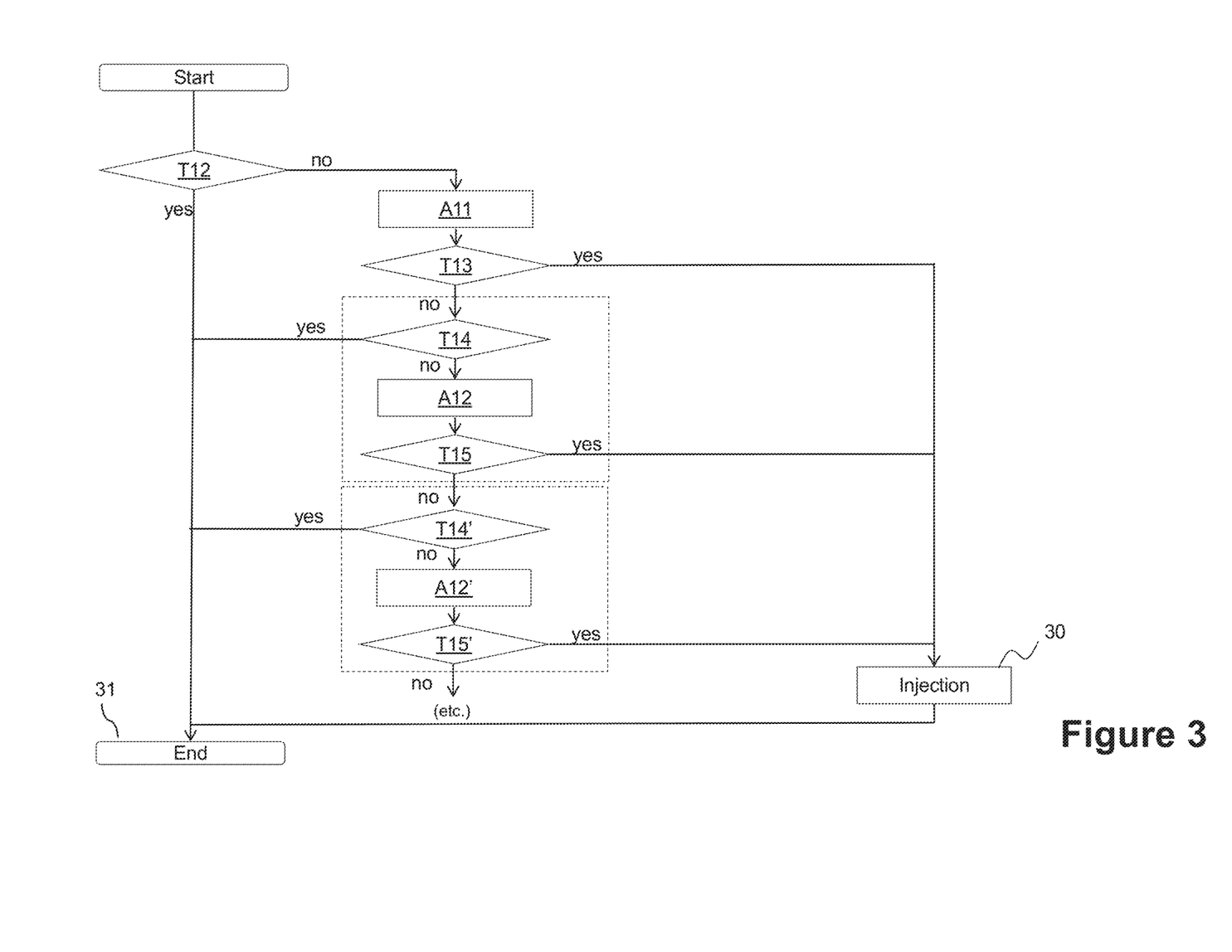
FIG. 3 is a flowchart of a load injection analysis algorithm in one particular embodiment of the load sequencing method of the invention.

Referring to FIG. 3, a detailed description is presented of the load injection analysis algorithm in one particular embodiment of the load sequencing method of the invention.

At a step T12, the control system carries out a first injection test to determine whether, upstream to the analyzed node, on the collector or among the loads to be collected by at least one node upstream to the analyzed node, there exists at least one load having a sequential order number of destination lower than the given sequential order number of destination.

In the event of a positive response to the first injection test (T12), the control system decides on non-injection of the load C (direct passage to a final step 31). Else it performs the following steps:

creation (step A11), among loads to be collected by at least one node downstream to the analyzed node, of a list LI1 of loads having a sequential order number of destination lower than the given sequential order number of destination and of a list LI2 of loads that are each interposed between a load from the list LI1 and the collector; and second injection test (step T13) to determine whether one of the first and second of the following injection conditions is verified: the first injection condition being that the list LI1 is empty; the second injection condition being that the list LI1 is not empty and that the list LI2 is empty.

If one of the first and second injection conditions is verified (positive response at the step T13), then the control system passes to a load injection step 30 for injecting the the load C and then to a final step 31.

If not (i.e. if neither of the first and second injection conditions is verified (negative response at the step T13)), the control system passes to a step T14 in which it carries out a third injection step to determine whether, upstream to the analyzed node, on the collector or among the loads to be collected by at least one node upstream to the analyzed node, there is at least one load having a sequential order number of destination lower than a sequential order number of destination possessed by a load of the list LI2 and for a same destination.

In the event of a positive response at the third injection test (T14), the control system decides on a non-injection of the load C (direct passage to the final step 31). If not, it carries out the following steps:

creation (step A12), among loads to be collected by at least one node downstream to the analyzed node, of a list LI3 of loads having a sequential order number of destination lower than the sequential order number of destination possessed by a load of the list LI2 and for a same destination, and creation of a list LI4 of loads each interposed between a load of the list LI3 and the collector; and fourth injection test (step T15) to determine whether one of the third and fourth of the following injection conditions is verified: the third injection condition being that the list LI3 is empty; the fourth injection condition being that the list LI3 is not empty and that the list LI4 is empty.

If one of the third and fourth injection conditions is verified (positive response at the step T15), the control system passes to the step 30 for injection of the load C and then to the final step 31.

If not (i.e. if neither of the third or fourth injection conditions is verified) (negative response at the step T15), the control system carries out at least one new iteration of the steps T14, A12 and T15 in taking as a list LI2, for each new iteration, the list LI4 of the previous iteration. In FIG. 3, only one new iteration is shown, with the notations T14', A12' and T15'.

There are various possible variants of the load injection analysis algorithm of FIG. 3, having lower performance but requiring fewer processing resources:

in a first variant, in the event of a negative response at the step T13, the control system directly decides on a non-injection of the load C (direct passage to the final step 31);

in a second variant, in the event of a negative response at the step T15, the control system directly decides on a non-injection of the load C (direct passage to the final step 31);

in a third variant, in the event of a negative response at the step T15, the control system carries out a predetermined number k (for example k=1) of new iterations of the steps T14, A12 and T15, in taking as a list LI2, for each new iteration, the list LI4 of the previous iteration.

Figure 4:
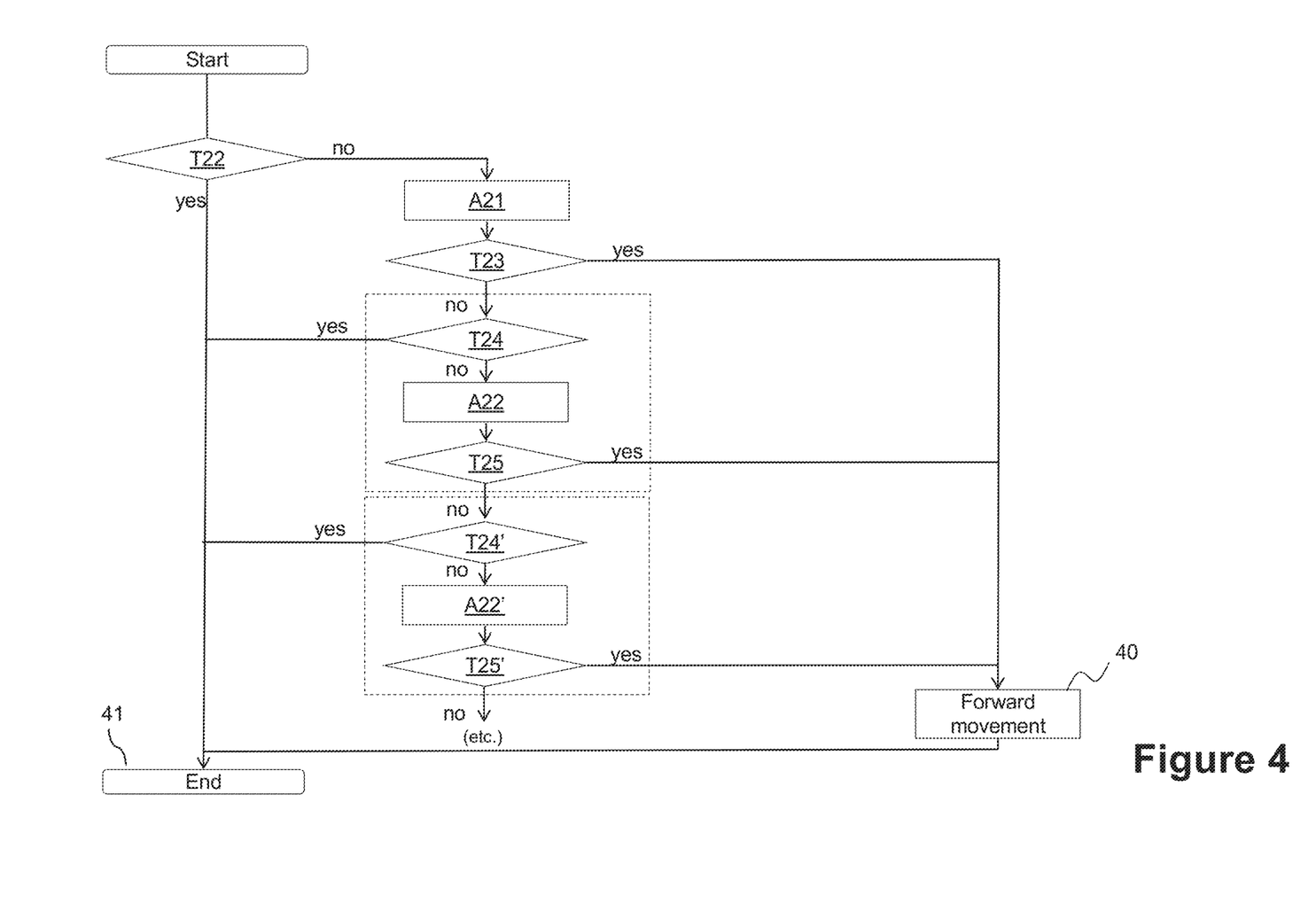
FIG. 4 is a flowchart of an algorithm for analysis of forward movement of loads in one particular embodiment of the load sequencing method of the invention.

Referring to FIG. 4, we now present a detailed view of the load forward movement analysis algorithm, in one particular embodiment of the load sequencing method of the invention.

In a step T22, the control system carries out a first forward movement test to determine if, among the loads to be collected by the analyzed node, there is at least one load having a sequential order number of destination lower than the given sequential order number of destination.

In the event of a positive response at the first forward movement test (T22), the control system decides that there will be no forward movement of the load C' (direct passage to the final step 41). If not, it carries out the following steps:

creation (step A21), among the loads to be collected by at least one node downstream to the analyzed node, of a list LA1 of loads having a sequential order number of destination lower than the given sequential order number of destination and of a list LA2 of loads each interposed between a load of the list LA1 and the collector; and second forward movement test (step T23) to determine whether one of the first and second following conditions of forward movement is verified: the first condition of forward movement being that the list LA1 is empty; the second condition of forward movement being that the list LA1 is not empty and that the list LA2 is empty.

If one of the first and second conditions of forward movement is verified (positive response at the step T23), the control system passes to a step 40 of forward movement of the load C' and then to a final step 31.

If not (i.e. if neither of the first or second conditions of forward movement is verified) (negative response at the step T23), then the control system passes to a step T24 in which it carries out a third forward movement test to determine whether, among the loads to be collected by the analyzed node, there exists at least one load having a sequential order number of destination lower than the sequential order number of destination possessed by a load of the list LA1 and for a same destination.

In the event of a positive response at the third forward movement test (T24), the control system decides that there will be no forward movement of the load C' (direct passage to the final step 41). If not, it carries out the following steps:

creation (step A22), among loads to be collected by at least one node downstream to the analyzed node, of a list LA3 containing loads having a sequential order number of destination lower than a sequential order number of destination possessed by a load from the list LA2 and for a same destination, and of a list LA4 containing loads that are each interposed between a load of the list LA3 and the collector; and fourth forward movement test (step T25) to determine whether one of the third and fourth of the following conditions of forward movement is verified: the third condition of forward movement being that the list LA3 is empty; the fourth condition of forward movement being that the list LA3 is not empty and that the list LA4 is empty.

If one of the third and fourth conditions of forward movement is verified (positive response at the step T25), then the control system passes to the forward movement step 40 for the forward movement of the load C' and then to the final step 41.

If not (i.e. if neither of the third and fourth forward movement conditions is verified) (negative response at the step T25), the control system carries out at least one new iteration of the steps T24, A22 and T25 in taking as a list LA2, for each new iteration, the list LA4 of the previous iteration. In FIG. 4, only one new iteration is represented, with the notations T24', A22' and T25'.

There are various possible alternative algorithms of lower performance but requiring fewer resources for the load forward movement of FIG. 4:

in a first variant, in the event of a negative response at the step T23, the control system directly decides that there will be no forward movement of the load C' (direct passage to the final step 41);

in a second variant, in the event of a negative response at the step T25, the control system directly decides that there will be no forward movement of the load C' (direct passage to the final step 41);

in a third variant, in the event of a negative response to the step T25, the control system carries out a predetermined number k (for example k=1) of new iterations of the steps T24, A22 and T25, in taking as a list LA2, for each new iteration, the list LA4 of the previous iteration.

Figure 5:
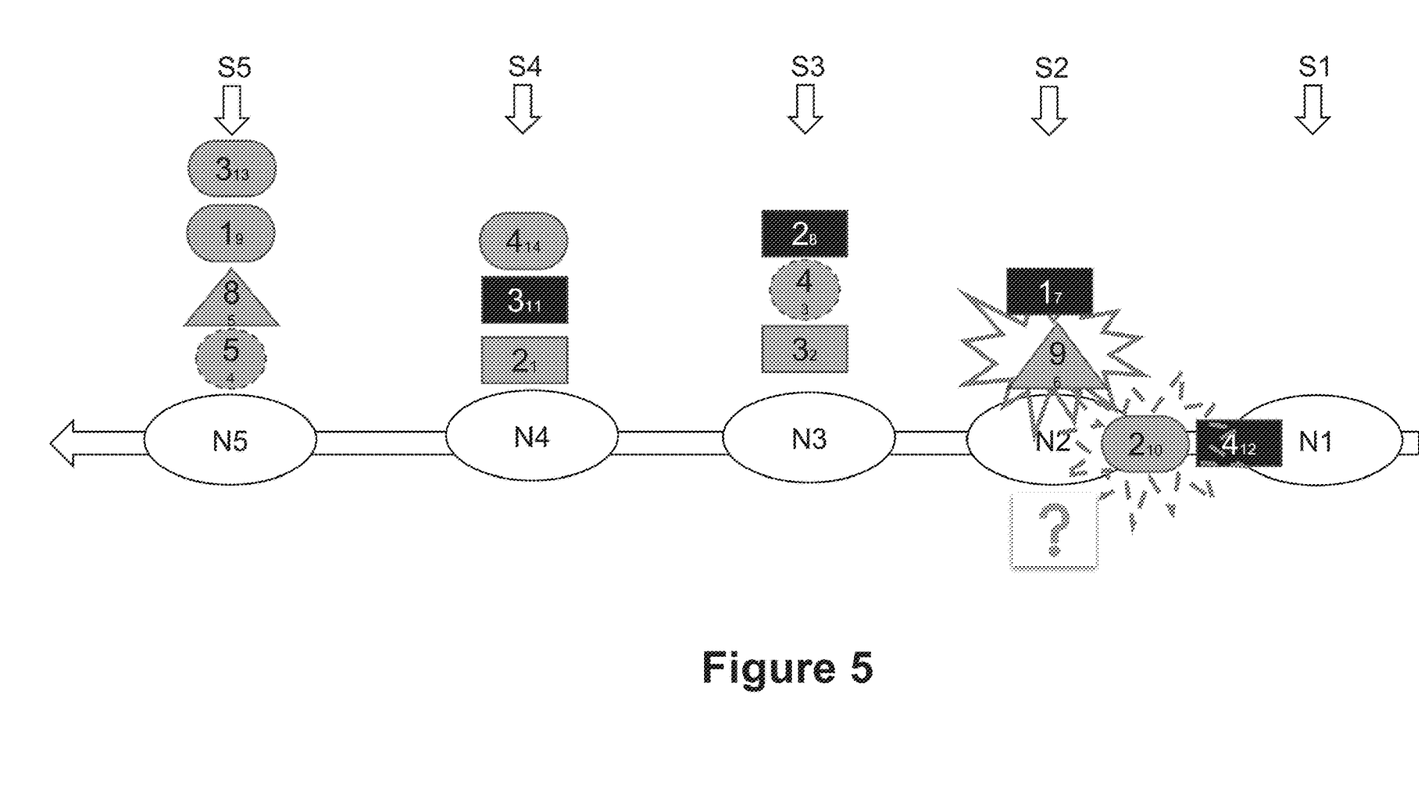
FIG. 5 illustrates a first example of a context of execution of the injection analysis algorithm of FIG. 3 (at the node N3 for the load referenced $9_6$) and of the forward movement analysis algorithm of FIG. 4 (at the node N2 for the load referenced $2_{10}$)
Figure 6:
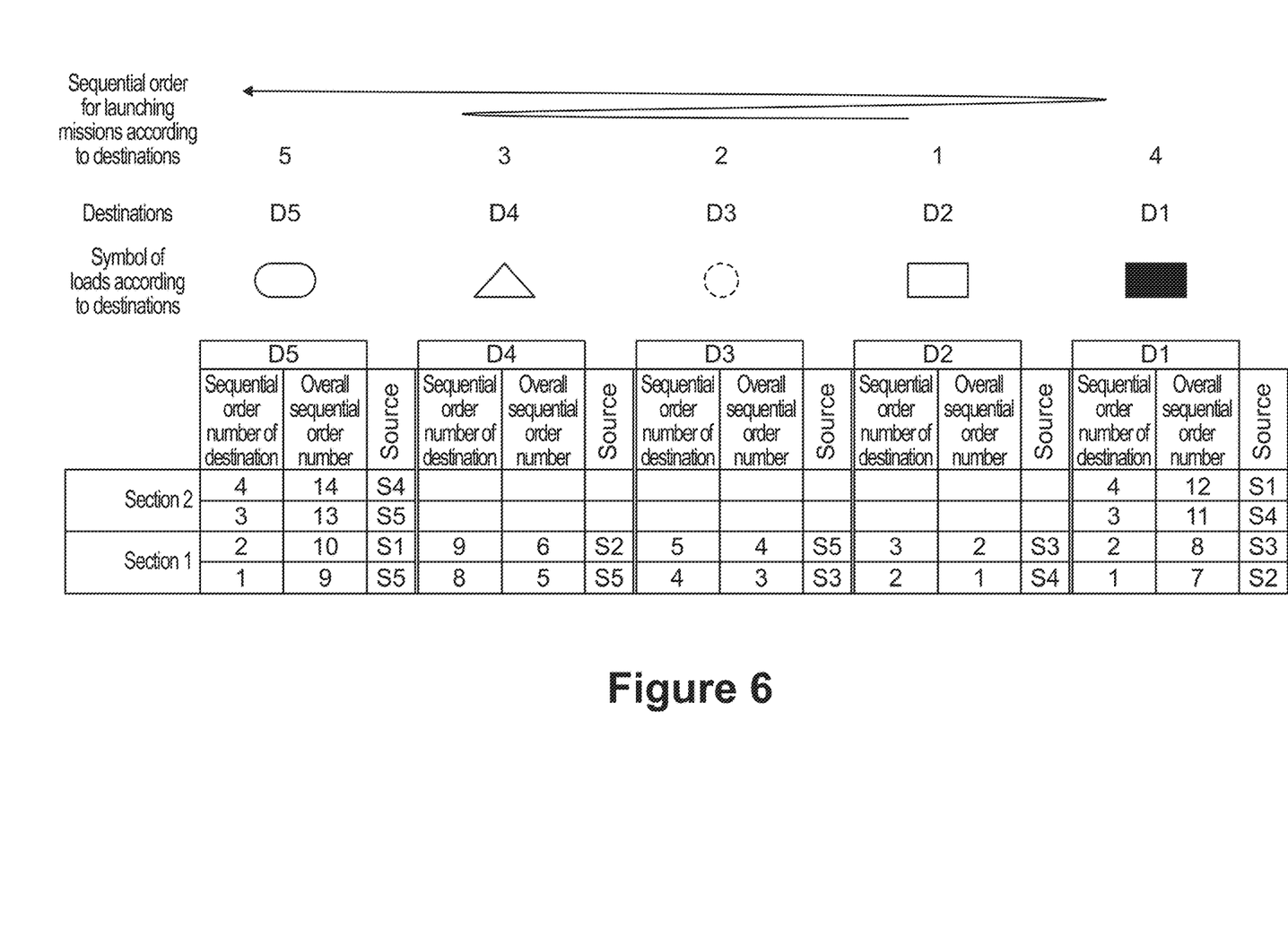
FIG. 6 illustrates and explains the notions of mission, sequential order number of destination and overall sequential order number, with reference to the loads of the context of execution of FIG. 5.

FIG. 5 illustrates a first example of a context of execution of the injection analysis algorithm of FIG. 3 (at the node N2 for the load referenced $9_6$) and of the forward movement analysis algorithm of FIG. 4 (at the node N2 for the load referenced $2_{10}$) FIG. 6 illustrates and explains the notions of mission, sequential order number of destination, overall sequential order number, relative to the loads of the execution context of FIG. 5.

In FIG. 5, each load is represented by a "background shape/color" pair in which there are two digits (one of normal size which is the sequential order number of destination of the load and the other shown in subscript which is the overall sequential order number of the load). Each "shape/color background" pair is specific to one of the destinations (as illustrated in FIG. 6): "rectangle/black background" for the destination D1; "rectangle/grey background" for the destination D2; "circle/grey background" for the destination D3; "triangle/grey background" for the destination D4; and "oval/grey background" for the destination D5.

The control system launches missions each aimed at managing the movement of a load from a source up to a destination. The sequential order of the missions corresponds to the overall sequential order of the loads. As illustrated in FIG. 6, it is assumed that the missions are distributed by section. In each section, the mission-launching command is predetermined as a function of the destinations, and for each destination there is a maximum quantity of missions. Thus, in the example of FIG. 5, the mission-launching command in each section corresponds to the following sequential order of the destinations: D2, D3, D4, D1 and D5, and for each of these destinations there is a maximum of two loads. The overall load sequential order is the following:

for the first section: $2_1$ (from S4 to D2), $3_2$ (from S3 to D2), $4_3$ (from S3 to D3), $5_4$ (from S5 to D3), $8_5$ (from S5 to D4), $9_6$ (from S2 to D4), $1_7$ (from S2 to D1), $2_8$ (from S3 to D1), $1_9$ (from S5 to D5) and $2_{10}$ (from S1 to D5);

for the second section: $3_{11}$ (from S4 to D1), $4_{12}$ (from S1 to D1), $3_{13}$ (from S5 to D5) and $4_{14}$ (from S4 to D5).

By way of an example, we shall now give a detailed description of the execution of the injection analysis algorithm of FIG. 3, to decide whether the load $9_6$ (having the overall sequential order number 6 and the sequential order number of destination 9 for the destination D4) can be injected into the collector, downstream to the node N2:

step T12: negative response, therefore passage to the step A11;

step A1: the list LI1 comprises the load $8_5$ and the list LI2 comprises the load $5_4$;

step T13: negative response, therefore passage to the step T14;

step T14: negative response, therefore passage to the step A12;

step A12: the list LI3 comprises the load $4_3$ and the list LI4 comprises the load $3_2$;

step T15: negative response, therefore passage to the step T14';

step T14': negative response, therefore passage to the step A12';

step A12': the list LI3 comprises the load $2_1$ and the list LI4 is empty;

step T15': positive response, therefore the load $9_6$ is injected into the collector (downstream to the node N2).

By way of an example, a detailed description is now given of the execution of the forward movement algorithm of FIG. 4 to decide whether the load $2_{10}$ (having the overall sequential order number 10 and the sequential order number of destination 2 for the destination D5) can be moved forward on the collector, downstream to the node N2:

step T22: negative response, therefore passage to the step A21;

step A21: the list LA1 comprises the load $1_9$ and the list LA2 comprises the loads $8_5$ and $5_4$;

step T23: negative response, therefore passage to the step T24;

step T24: negative response, therefore passage to the step A22;

step A22: the list LA3 comprises the load $4_3$ and the list LA4 comprises the load $3_2$;

step T25: negative response, therefore passage to the step T24';

step T24': negative response, therefore passage to the step A22';

step A22': the list LA3 comprises the load $2_1$ and the list LA4 is empty;

step T25': positive response, therefore the load $2_{10}$ is injected into the collector (downstream to the node N2).

Figure 7:
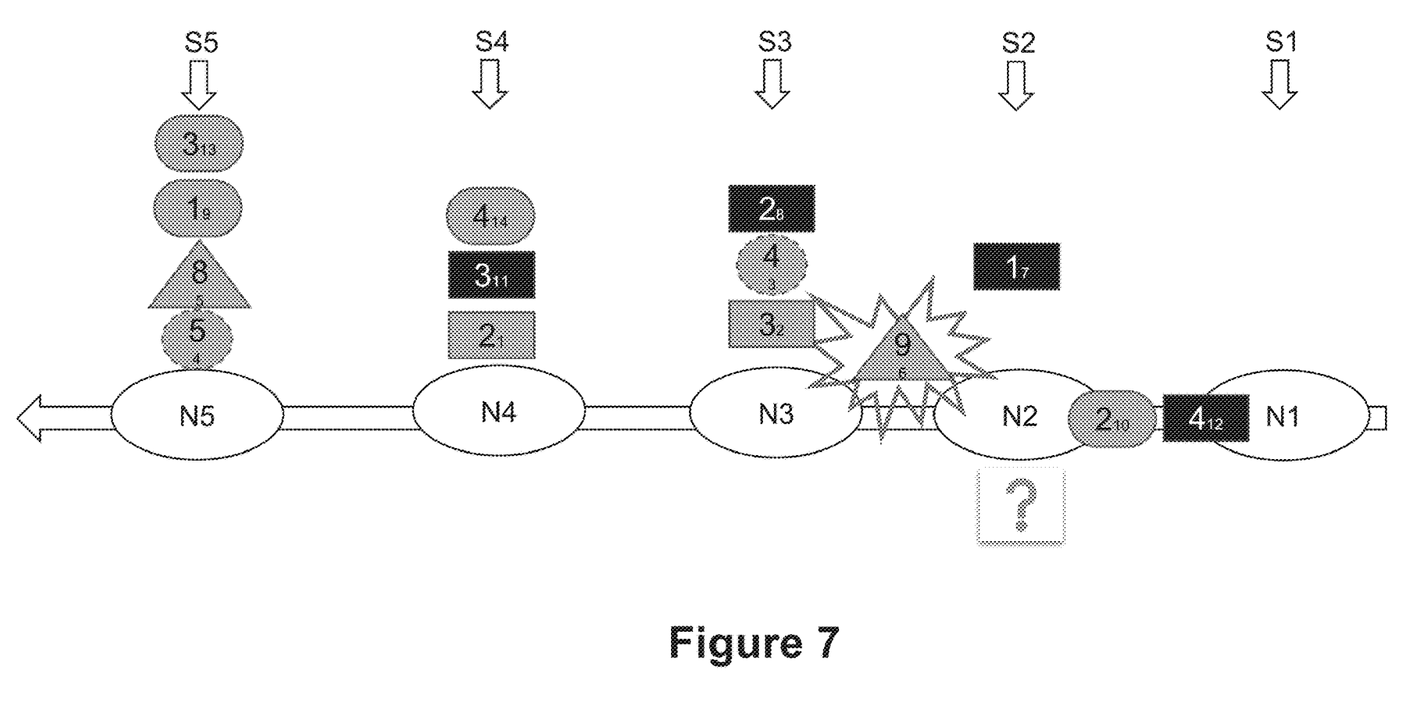
FIG. 7 illustrates a second example of context of execution of the forward movement analysis algorithm of FIG. 4 (at the node N3 for the load referenced $9_6$)

FIG. 7 illustrates a second example of a context of execution of the forward movement analysis algorithm of FIG. 4 (at the node N3 for the load referenced $9_6$). As compared with FIG. 5, this figure is situated at a subsequent instant, assuming that the load $9_6$ had been injected into the collector (downstream from the node N2). A detailed description is now given of the execution of the forward movement algorithm of FIG. 4, to decide whether the load $9_6$ can be moved forward on the collector, downstream to the node N3:

step T22: negative response, hence passage to the step A21;

step A21: the list LA1 comprises the load 8 and the list LA2 comprises the load $5_4$;

step T23: negative response, therefore passage to the step T24;

step T24: positive response, (there is the load $4_3$ that arrives from the source S3 and has not yet been collected by the node N3), hence the load $9_6$ cannot be moved forward on the collector (no forward movement so long as the load $4_3$ has not been injected into the collector, (downstream to the node N3).

Figure 8:
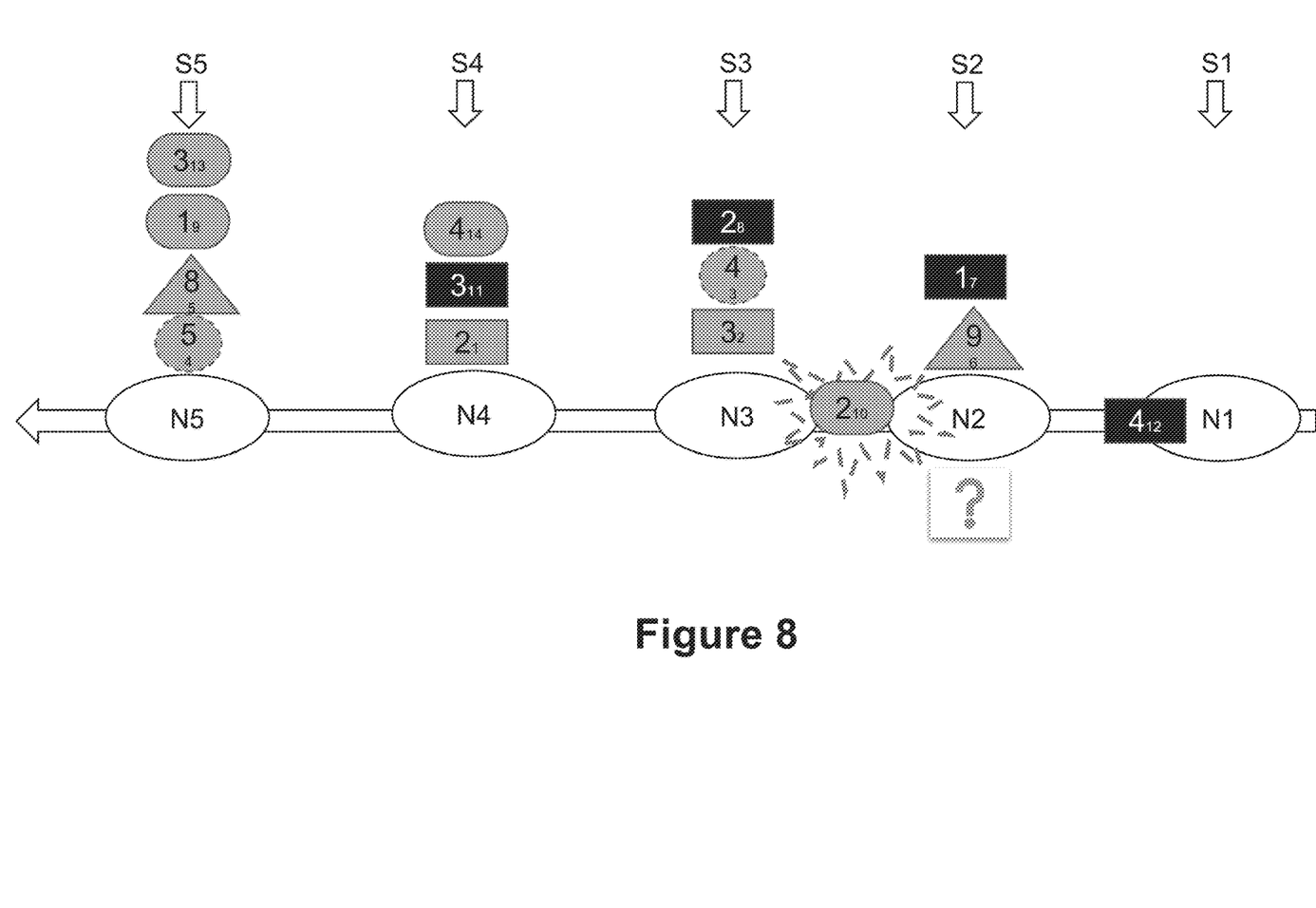
FIG. 8 illustrates a third example of an execution context of the forward movement analysis algorithm of FIG. 4 (at the node N3 for the load referenced $2_{10}$)

FIG. 8 illustrates a third example of a context of execution of the forward movement analysis algorithm of FIG. 4 (at the node N3 for the load referenced $2_{10}$). As compared with FIG. 5, the figure is situated at a subsequent instant, assuming that the load $2_{10}$ has been moved forward on the collector (downstream to the node N2). A detailed description is now given of the execution of the forward movement algorithm of FIG. 4, to decide whether the load $2_{10}$ can be moved forward on the collector, downstream to the node N3:

step T22: negative response, hence passage to the step A21;

step A21: the list LA1 comprises the load $1_9$ and the list LA2 comprises the loads $8_5$ et $5_4$;

step T23: negative response, therefore passage to the step T24;

step T24: positive response, (there is the load $4_3$ that arrives from the source S3 and has not yet been collected by the node N3), hence the load $9_6$ cannot be moved forward on the collector (no forward movement so long as the load $4_3$ has not been injected into the collector (downstream to the node N3).

Figure 9:
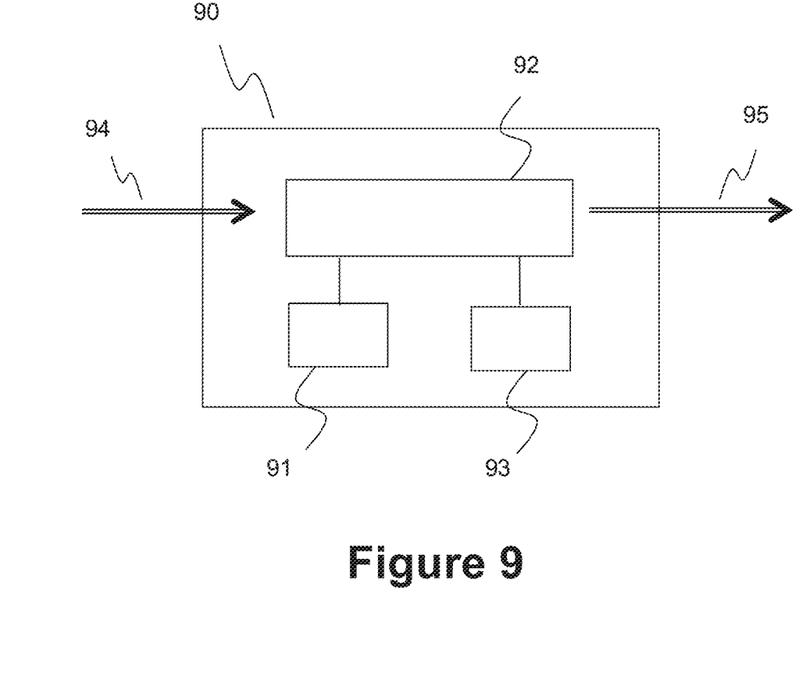
FIG. 9 presents the structure of a control system according to one particular embodiment of the invention.

FIG. 9 presents the structure of the control system 90 according to one particular embodiment of the invention. This device comprises a random-access memory 93 (for example a RAM), a processing unit 91, equipped for example with a processor and controlled by a computer program stored in a read-only memory 92 (for example a ROM or a hard-disk drive).

At initialization, the code instructions of the computer program are for example loaded into the random-access memory 93 and then executed by the processor of the processing unit 91 to implement the load-sequencing method of the invention. The processing unit 91 inputs commands 94. The processor of the processing unit 91 processes the commands and generates output instructions or commands to control (command) different elements included in the automated distribution system, especially the sources S1 to S5, the FIFO type source buffer devices F1 to F5, le collector 1, the destinations D1 to D5 and the FIFO type destination buffer devices F1' to F5'.

This FIG. 9 illustrates only one particular way, among several possible ways, of carrying out the technique of the invention in any of its embodiments. Indeed, the control system can be carried out equally well on a reprogrammable computing machine (for example a PC computer, a DSP processor, a microcontroller etc.) executing a program comprising a sequence of instructions, or on a dedicated computation machine (for example a set of logic gates such as an FPGA or an ASIC or any other hardware module).

Should the control system be made with a reprogrammable computing machine, the corresponding program (i.e. the sequence of instructions) could be stored in a storage medium that is detachable (such as for example a floppy disk, a CD-ROM or a DVD-ROM) or non-detachable, this storage medium being partially or totally readable by a computer or a processor.

The invention claimed is:

1. A method for sequencing loads, implemented by a control system in an automated distribution system comprising:
    sources;
    at least one destination;
    a collector configured to transport loads up to said at least one destination and comprising a plurality of successive nodes, each node being configured to collect loads exiting from one of the sources;
    said control system being configured to process customer orders, each order listing loads to be extracted from the sources, these loads being provided in a given ascending order of destination to a given destination, the control system defining an overall ascending order for the loads listed in the customer orders and guaranteeing, for each source, that exiting loads will comply with the overall ascending order and the ascending orders of destination associated with the customer orders,
    wherein said control system is further configured to perform, for at least one analyzed node, an injection analysis comprising the following steps to determine whether a load C having a given order number of destination for a given destination can be injected into the collector:
    a) a first injection test to determine whether there exists, upstream to the analyzed node, on the collector or among the loads to be collected by at least one node upstream to the analyzed node, at least one load having an order number of destination lower than the given order number of destination;
    b) if a response to the first injection test is positive, said control system commands said analyzed node to not inject the load C into the collector, wherein if the response to the first injection test is not positive, said control system performs the following steps:
    creating, among loads to be collected by at least one node downstream to the analyzed node:
        a list LI1 of loads having an order number of destination lower than the given order number of destination, and
        a list LI2 of loads that are each interposed between a load of the list LI1 and the collector;
    performing a second injection test to determine whether one of the following first and second conditions of injection is verified: in the first condition of injection, the list LI1 is empty; in the second condition of injection, the list LI1 is not empty and the list LI2 is empty;
    wherein if one of the first and second injection conditions is verified, then said control system commands said analyzed node to injects said load C into the collector.

2. The method according to claim 1 wherein, if neither the first nor the second condition of injection is verified, the injection analysis carried out by said control system further comprises:
    a') a third injection test to determine whether, upstream to the analyzed node, on the collector or among the loads to be collected by at least one node upstream to the analyzed node, there is at least one load having an order number of destination lower than the order number of destination possessed by a load from the list LI2 and for a same destination;
    b') if a response to the third injection test is positive, said control system commands said analyzed node to not inject the load C into the collector, wherein if the response to the third injection test is not positive, said control system performs the following steps:
    creation, among the loads to be collected by at least one node downstream to the analyzed node:
        a list LI3 of loads having an order number of destination lower than the order number of destination possessed by a load of the list LI2 and for a same destination, and
        a list LI4 of loads that are each interposed between a load of the list LI3 and the collector;
    performing a fourth injection test to determine whether one of the following third and fourth conditions of injection is verified: in the third condition of injection, the list LI3 is empty; in the fourth condition of injection the list LI3 is not empty and the list LI4 is empty;
    wherein if one of the third and fourth conditions of injection is verified, then said control system commands said analyzed node to injects the load C into the collector.

3. The method according to claim 2 wherein, if neither the third or fourth conditions of injection is verified, then the injection analysis carried out by said control system comprises at least one new iteration of the steps a') and b') in taking the list LI4 of the previous iteration as the list LI2 for each new iteration.

4. The method according to claim 1, wherein the injection analysis is carried out by said control system for each of the nodes except for a first node that is furthest upstream to the destinations.

5. The method according to claim 1, wherein said control system analyses forward movement, for at least one analyzed node, said control system further performing the following steps to determine whether a load C', coming from a node upstream to the analyzed node and having a given order number of destination for a given destination, can be moved forward on the collector:

1) a first forward movement test to determine whether, among the loads to be collected by the analyzed node, there is at least one load having an order number of destination lower than the given order number of destination;
2) if a result of the first forward movement test is positive said control system commands said analyzed node to not move load C' forward on the collector: wherein if the result to the first forward movement test is not positive, said control system performs the following steps:
   creating, among the loads to be collected by at least one node downstream to the analyzed node:
      a list LA1 of loads having an order number of destination lower than the given order number of destination, and
      a list LA2 of loads that are each interposed between a load of the list LA1 and the collector;
   performing a second forward movement test to determine whether one of the following first and second conditions of forward movement is verified: in the first condition of forward movement, the list LA1 is empty; in the second condition of forward movement, the list LA1 is not empty and the list LA2 is empty;
   wherein if one of the first and second conditions of forward movement is verified, said control system commands said analyzed node to moves the load C' forward on the collector.

6. The method according to claim 5, wherein the analysis of forward movement is performed by said control system for each of the nodes except said first node most upstream to the destinations.

7. The method according to claim 5, wherein, if neither the first nor the second condition of forward movement is verified, then the analysis of forward movement carried out by said control system further comprises:
   1') a third forward movement test to determine if, among the loads to be collected by the analyzed node, there is at least one load having an order number of destination lower than an order number of destination possessed by a load of the list LA2 and for a same destination;
   2') if the result of the third forward movement test is positive, said control system commands said analyzed node to not move the load C' on the collector: wherein if the result to the third forward movement test is not positive, said control system performs the following steps:
   creating, among loads to be collected by at least one node downstream to the analyzed node:
      a list LA3 containing loads having an order number of destination lower than an order number of destination possessed by a load of the list LA2 and for a same destination, and
      a list LA4 containing loads that are each interposed between a load of the list LA3 and the collector;
   performing a fourth forward movement test to determine whether one of the following third and fourth conditions of forward movement is verified: in the third condition of forward movement, the list LA3 is empty; in the fourth condition of forward movement, the list LA3 is not empty and the list LA4 is empty;
   wherein if one of the third and fourth conditions of forward movement is verified, said control system commands said analyzed node to move the load C' forward on the collector.

8. The method according to claim 7, wherein, if neither the third nor the fourth condition of forward movement is verified, the analysis of forward movement performed by said control system comprises at least one new iteration of the steps 1') and 2'), in taking the list LA4 of the previous iteration as the list LA2 for each new iteration.

9. A computer-readable, non-transient storage medium storing a computer program thereon comprising executable instructions, which when executed by a computer comprise:
   sequencing loads by a control system in an automated distribution system;
   the automated distribution system comprising:
      sources;
      at least one destination;
      a collector configured to transport loads up to said at least one destination and comprising a plurality of successive nodes, each node being configured to collect loads exiting from one of the sources;
   said control system being configured to process customer orders, each order listing loads to be extracted from the sources, these loads being provided in a given ascending order of destination to a given destination, the control system defining an overall ascending order for the loads listed in the customer orders and guaranteeing, for each source, that exiting loads will comply with the overall ascending order and the ascending orders of destination associated with the customer orders; and
   said control system performing, for at least one analyzed node, an injection analysis comprising the following steps, to decide whether a load C having a given order number of destination for a given destination can be injected into the collector:
   a) a first injection test to determine whether there exists, upstream to the analyzed node, on the collector or among the loads to be collected by at least one node upstream to the analyzed node, at least one load having an order number of destination lower than the given order number of destination;
   b) if the response to the first injection test is positive, said control system commands said analyzed node to not inject the load C into the collector; wherein if the response to the action test is not positive, said control system performs the following steps:
      creating, among loads to be collected by at least one node downstream to the analyzed node:
         a list LI1 of loads having an order number of destination lower than the given order number of destination, and
         a list LI2 of loads that are each interposed between a load of the list LI1 and the collector;
      performing a second injection test to determine whether one of the following first and second conditions of injection is verified: in the first condition of injection, the list LI1 is empty; in the second condition of injection the list LI1 is not empty and the list LI2 is empty;
      wherein if one of the first and second injection conditions is verified, then said control system commands said analyzed node to injects said load C into the collector.

* * * * *